United States Patent

[11] 3,598,156

| [72] | Inventors | William L. Ulmer;<br>Harry W. McQuaid, both of Cleveland, Ohio |
|---|---|---|
| [21] | Appl. No. | 764,353 |
| [22] | Filed | July 15, 1968<br>Division of Ser. No. 491,590, Sept. 30, 1965, Pat. No. 3,397,445. |
| [45] | Patented | Aug. 10, 1971 |
| [73] | Assignee | Jordan Band, Trustee<br>Cleveland, Ohio |

[54] BIMETAL TUBING AND METHOD OF MAKING SAME
8 Claims, 10 Drawing Figs.

[52] U.S. Cl. .................................................. 138/143, 138/140, 29/196.5
[51] Int. Cl. ................................................. F16l 9/14
[50] Field of Search ........................................ 138/143, 140; 29/196.5; 285/21

[56] References Cited
UNITED STATES PATENTS

| 674,394 | 5/1901 | Beck et al. | 138/143 X |
| 1,468,905 | 9/1923 | Herman | 29/196.5 |
| 1,514,129 | 11/1924 | Clark | 138/143 X |
| 2,060,034 | 11/1936 | Chandler | 138/143 |
| 2,126,244 | 8/1938 | Cook | 29/196.5 |
| 2,258,327 | 10/1941 | Kramer | 29/196.5 X |
| 2,428,318 | 9/1947 | Nachtman | 29/196.5 X |
| 3,069,209 | 12/1962 | Bauer | 138/143 X |
| 3,257,178 | 6/1966 | Seuerns | 29/196.5 X |

Primary Examiner—Herbert F. Ross
Attorney—Meyer, Tilberry and Body

ABSTRACT: An improved elongated bimetal tubing comprised of a first outer shell and a second inner shell, each formed from different metals, and having therebetween a third bonding metal metallurgically bonded to each. The third metal includes three strata; the first comprising an alloy of the outer shell metal and the bonding metal; the second comprising primarily the bonding metal; and, the third comprising an alloy of the inner shell metal and the bonding metal.

PATENTED AUG 10 1971
3,598,156
SHEET 1 OF 2
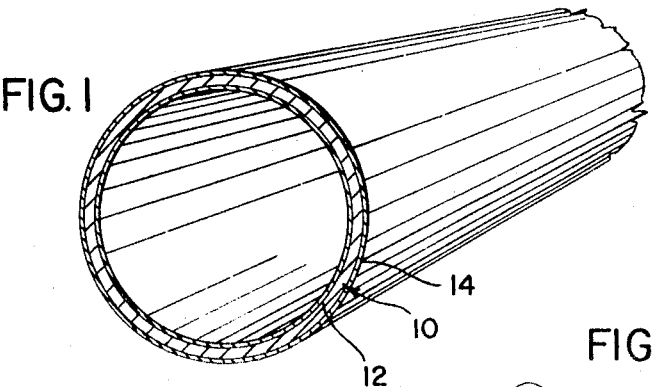
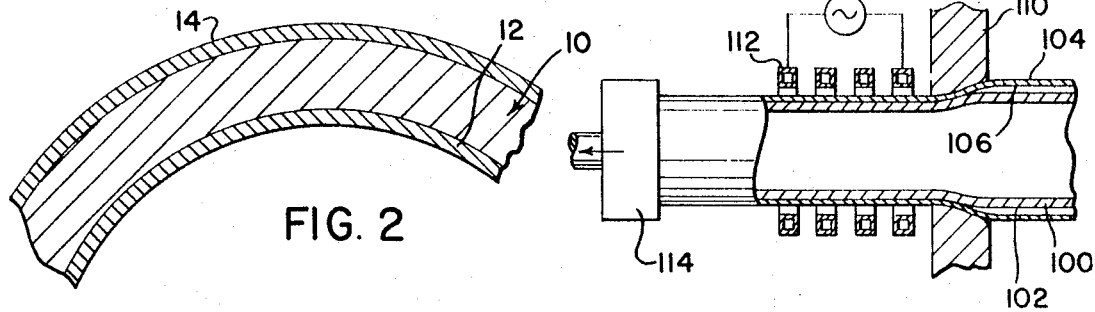
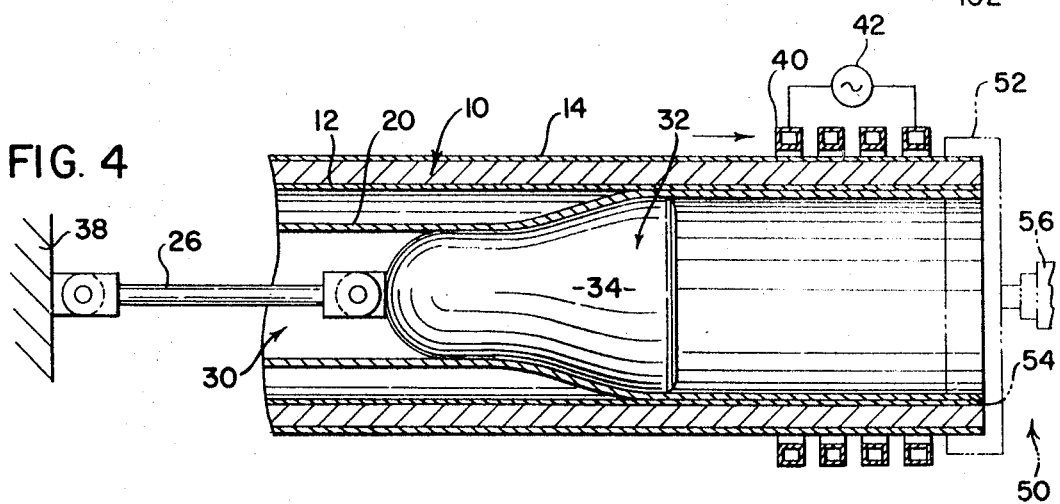
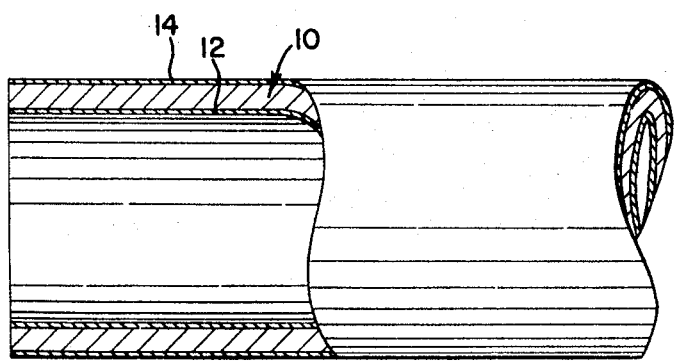
INVENTORS.
WILLIAM L. ULMER &
HARRY W. McQUAID
BY Meyer, Tilberry & Body
ATTORNEYS

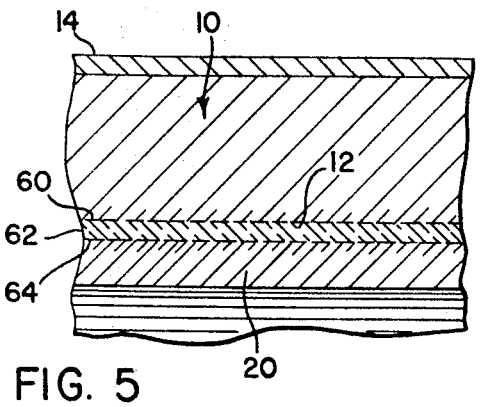
FIG. 5
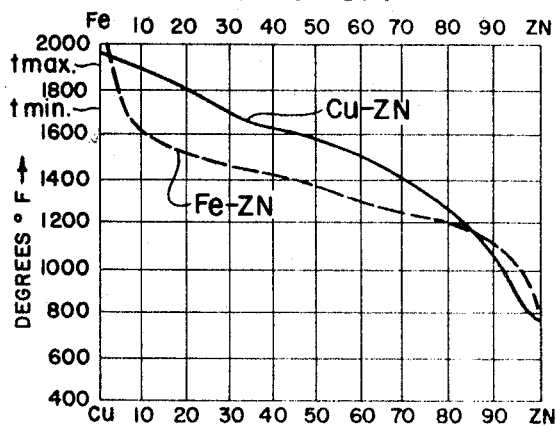
FIG. 6A
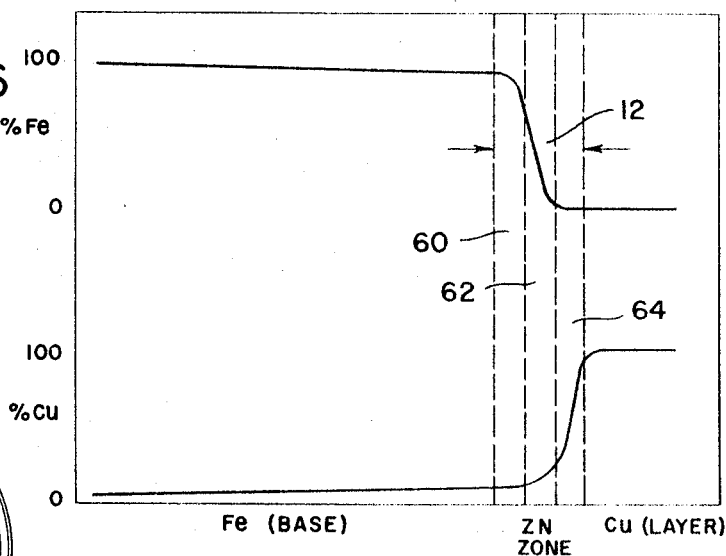
FIG. 6
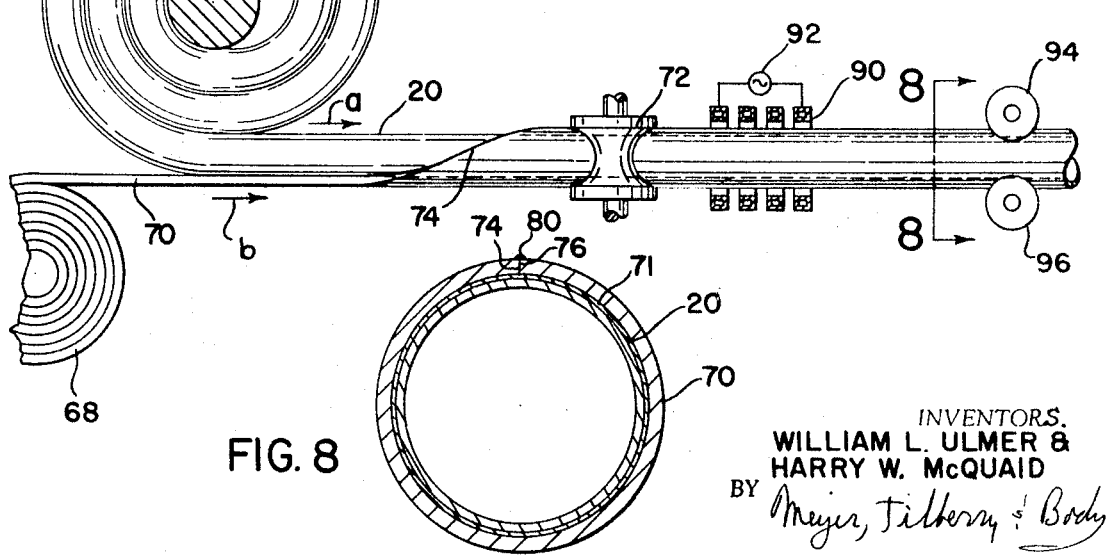
FIG. 7
FIG. 8
INVENTORS.
WILLIAM L. ULMER &
HARRY W. McQUAID
BY Meyer, Tilberry & Body
ATTORNEYS 3,598,156

BIMETAL TUBING AND METHOD OF MAKING SAME

This application is a divisional application of application Ser. No. 491,590, filed Sept. 30, 1965 and now issued as U.S. Letters Pat. 3,397,445.

The present invention pertains to the art of metal tubing and more particularly to a bimetal tubing and a method of making the same.

This invention is particularly applicable to a bimetal tubing having an outer tube or sleeve of ferrous metal and an inner tube or sleeve of a cupreous or copper based metal, and it will be described with particular reference thereto; however, it will be appreciated that the invention has much broader applications, and it may be used to join two dissimilar metals into a unitary body.

In recent years, there has been a drastic increase in the use of copper tubing, even though the cost of copper tubing has been, and still is, substantially higher than the cost of iron or steel pipe having similar physical characteristics. This increased use of copper tubing, irrespective of its higher cost, results from the ability of copper tubing to handle fluid which tends to corrode the inner surface of the lower priced iron or steel pipe. The superior corrosion resistance of copper tubing makes this tubing a necessary element in many refrigerating units, liquid conduit systems and other similar installations.

In view of the cost differential between high corrosion resistant copper tubing and the low corrosion resistant standard iron or steel pipe, extensive efforts have been devoted to the development of a pipe or tubing having, at the same time, the higher corrosion resistant properties of copper tubing and the lower cost of the standard iron or steel pipe. Heretofore, this development work has been singularly unsuccessful.

It has been known for some time that the corrosion resistant characteristic of copper tubing results from the continuous copper surface in direct contact with fluid being conveyed. There is no need, from a corrosion resistant standpoint, for forming the outer casing of the tubing from copper. In other words, as long as the inner surface of the tubing is formed from copper, the remainder of the tubing can be produced from iron or other ferrous based metal without reducing the resistance of the tubing to corrosion by liquid flowing therethrough. Consequently, a major portion of the abovementioned development work to find a substitute for copper tubing has been directed toward the production of an iron or steel pipe with an inner continuous surface of copper or similar material. At first, the inner surface of a standard iron or steel pipe was coated with a thin continuous layer of copper. This process was unsatisfactory because it was impossible to provide a uniform, continuous coating of copper on the inner surface of the pipe, especially when the pipe had a relatively small inner diameter. The copper coating within the pipe had various areas where the ferrous base metal was exposed to fluid being conveyed through the pipe. The pipe would therefore corrode at these exposed areas. The rate of corrosion was somewhat accelerated due to the galvanic action between the adjacent iron and copper at the inner surface of the pipe.

In out copending application, Ser. No. 170,470, filed Feb. 1, 1962, we have disclosed a method of forming a continuous coating of copper on the inner surface of a standard ferrous pipe; however, the process disclosed and claimed in this prior copending application has not been generally adopted by the trade because the cost of producing the pipe does not, at this time, justify the required retooling for this process.

In view of the disadvantages of coating the inner surface of ferrous pipe with a thin layer of copper, it has been suggested that a copper sleeve be inserted within an iron or steel pipe. Although this arrangement appears to be theoretically feasible, it has been unsuccessful in practice. Heretofore, the copper sleeve inserted within the iron pipe could not be bonded securely to the inner wall of the pipe. Consequently, during thermocycling of the pipe, the inner sleeve would separate from the pipe and form gas pockets which were insulators to the conductivity of the heat through the wall of the pipe. When this pipe was to be used in a refrigerating unit, these gas pockets seriously limited the usefulness of this pipe. In addition, the inferior bond between the inner copper sleeve and the outer iron pipe created serious difficulties while the pipe was formed into intricate shapes. For instance when the pipe was bent, the sleeve would separate from the inner wall of the pipe and cause restrictions at the bend. Separation of the sleeve from the inner surface of the pipe was exaggerated during the bending operation because the inner sleeve would be elongated or shortened a different amount than the surface against which it was abutted.

It has also been suggested to provide a laminated strip having a layer of copper and a layer of iron or steel. This strip was rolled into a pipe with the edges of the strip being overlapped. Thereafter, the seam of the rolled strip was sealed by various arrangements. This particular type of pipe was unsuccessful because of its high cost when compared to the cost of copper tubing or similar tubing.

All of these disadvantages and others are completely overcome by the present invention which is directed toward a bimetal tubing and method of making same, which tubing includes an inner copper based sleeve and an outer ferrous pipe with the sleeve and pipe being joined to each other in a manner to produce substantially integral tubing.

In accordance with the present invention, there is provided an improvement in a metal tubing including an outer shell or sleeve formed from a first metal and an inner shell or sleeve formed from a second metal. The improvement in accordance with the invention includes bonding layer between the two shells, this layer comprises primarily a third metal having a melting point below the melting point of the first and second metals. This intermediate layer is metallurgically bonded to the outer shell by an alloy of the first and third metals and to the inner shell by an alloy of the second and third metals.

By providing an intermediate alloyed joint between the inner and outer shells forming the tubing, the inner shell cannot separate from the outer shell during subsequent use of the tubing.

In accordance with another aspect of the present invention, there is provided a method of joining copper into a ferrous base having a mounting surface, this method comprises the steps of alloying a thin layer of low temperature melting metal selected from the class consisting of zinc, tin, silver and aluminum, onto the mounting surface; applying a layer of copper based metal onto said surface; exerting a high pressure between said surface and said copper based alloy; and, simultaneously, heating the ferrous base and copper based metal to a temperature below the melting temperature of the ferrous base and the copper based metal and substantially above the melting temperature of the low temperature melting metal whereby the low temperature melting metal alloys with the copper based metal.

By providing the successive alloying of the low temperature melting metal with first the ferrous base and then the copper based metal, an alloyed joint is formed between the ferrous base and the copper based metal. This alloyed joint has proven to be inseparable so that the two separate metals are joined as a unit and cannot be inadvertently separated.

The primary object of the present invention is the provision of a bimetal tubing having an outer metal sleeve and an inner metal sleeve which tubing is economical to produce and durable in use.

Another object of the present invention is the provision of a bimetal tubing having an outer metal sleeve and an inner metal sleeve which tubing is a unitary structure.

Still another object of the present invention is the provision of a bimetal tubing having an outer metal sleeve and an inner metal sleeve which tubing has an alloyed joint between the sleeves and formed from a metal dissimilar from the metal or metals forming the sleeves.

These and other objects and advantages will become apparent from the following description used to illustrate the preferred embodiment of the invention as read in connection with the accompanying drawings in which:

FIG. 1 is a pictorial view illustrating, somewhat schematically, the outer sleeve utilized in the present invention;

FIG. 2 is an enlarged, cross-sectional view, illustrating somewhat schematically, a modification of the outer sleeve shown in FIG. 1;

FIG. 3 is a cutaway, cross-sectional view illustrating the modified outer sleeve as shown in FIG. 2;

FIG. 4 is a cross-sectional, side elevational view illustrating, somewhat schematically, the method contemplated by the present invention;

FIG. 4A is a cross-sectional, side elevational view showing, somewhat schematically, a modification of the method illustrated in FIG. 4;

FIG. 5 is an enlarged, cross-sectional view taken generally along line 5-5 of FIG. 4;

FIG. 6 is a graph illustrating an aspect of the present invention;

FIG. 6A is a graph illustrating certain properties of the metals utilized in practicing the present invention;

FIG. 7 is a side elevational view showing, somewhat schematically, a modification of a preferred embodiment of the invention contemplated herein; and, FIG. 8 is an enlarged, cross-sectional view taken generally along line 8-8 of FIG. 7.

Referring now to the drawings wherein the showings are for the purpose of illustrating preferred embodiments of the invention only and not for the purpose of limiting same, FIGS. 1—3 show a somewhat standard iron or steel pipe 10. This pipe may be formed from a variety of ferrous materials; however, in practice, the pipe is the type known commercially as "black iron pipe." For the purpose of this discussion, the pipe 10 may also be defined as an outer shell or sleeve; however, it will be appreciated that whether termed a pipe, shell or sleeve, the pipe 10 is a relatively high strength tubular member which could support, by itself, the flow of fluid therethrough. In accordance with the invention, the pipe 10 is provided with an inner layer 12 of a metal having a melting point substantially below the melting point of the metal forming the pipe and, also, substantially below the melting point of copper which is to be inserted within pipe 10, in a manner to be hereinafter described in detail. Also, the metal forming the layer 12 must be soluble in both the metal forming the pipe 10 and in copper. A variety of metals, such as zinc, tin, silver and aluminum, will have the above-mentioned characteristics; however, in practice, the layer 12 is formed from zinc.

The layer 12 must be alloyed to the inner surface of the pipe 10; by therefore, the zinc layer is placed on the inner surface of the pipe by hot dip galvanizing process. This galvanizing process is common in the art of coating pipe; therefore, it is not herein described in detail. Since the layer 12 is alloyed to the pipe 10, a metallurgical bond is formed between the layer and the pipe so that the layer will not separate from the pipe during subsequent use thereof. Since it is somewhat more difficult to provide only an inner layer of alloyed zinc on the pipe, in practice the pipe 10 has the inner layer 12 and an outer layer 14 of alloyed zinc formed during the hot dip galvanizing process. These two alloyed layers are clearly shown in FIGS. 2 and 3.

Referring now to FIG. 4, a copper tubing or sleeve 20 is inserted within the pipe or sleeve 10 and, for the purpose of easy insertion, the outer diameter of the copper sleeve is at least a few thousands of an inch smaller than the inner diameter of the ferrous sleeve 10. The difference in the diameters of the sleeves is exaggerated in FIG. 4 so that the essence of the invention will be more evident. After the sleeve 20 is inserted within sleeve 10, an apparatus 30 mechanically expands the sleeve 20 into tight physical contact with the sleeve 10. A variety of arrangements could be utilized for expanding the copper sleeve 20, however, in accordance with the preferred embodiment of the invention, there is provided a mandrel 32 having an external surface 34 tapering outwardly from left to right. The mandrel 32 is fixedly secured in a given position by a rod 26 secured onto a physical restraint 38.

In front of the mandrel 32 there is provided a multiturn induction coil 40 connected across a high frequency power source, schematically represented as a generator 42. At the end of the composite sleeve structure, beyond the coil 40, there is provided a sleeve pulling mechanism 50. This mechanism is schematically shown as including a clamp 52 for engaging the outer surface of sleeve 10 and a clamp 54 for engaging the inner surface of sleeve 20. These clamps are illustrated schematically as dashed lines because a variety of clamping arrangements could be used without departing from the intended spirit and scope of the present invention. The clamps 52, 54 are secured onto a puller 56 which may take a variety of structural forms, such as a rod and cylinder or a chain and pulley. Such pullers are well known in the art of extruding pipe and similar elongated elements.

In operation, the mandrel 32 expands sleeve 20 into tight engagement with the inner layer 12 of sleeve 10 as the puller 56 pulls the sleeves 10, 20 past the mandrel. Thereafter, the induction heating coil 40 raises the temperature of the tightly engaged sleeves 10, 20 by inducing current flow within the sleeve structure in a manner well known in the induction heating art. As the temperatures of the sleeves increase, the copper sleeve tends to expand outwardly a greater amount than the outer sleeve 10; therefore, an extremely high pressure is exerted between sleeve 20 and the zinc layer !12. The temperature of layer 12 is increased substantially above the melting point of the metal forming the layer, but below the melting point of the sleeves 10, 20. In practice, the temperature of layer 12 is increased to approximately 1700°—1900° F. This temperature is substantially below the melting temperature of the sleeve 10 and somewhat below the melting temperature of sleeve 20.

As the layer 12 is heated to a temperature substantially above its melting temperature, the layer 12 tends to liquefy; however, during this liquefaction the copper forming sleeve 20 starts to dissolve in or alloy with the metal, such as zinc, forming layer 12. As shown in the graph of FIG. 6A, when the alloying process increases the amount of copper dissolved in or alloyed with layer 12, the solidification temperature of the resulting alloy adjacent sleeve 20 increases toward the heated temperature of layer 12. This causes a solidification of the alloyed layer 12 so that an alloy of copper and zinc is formed at the boundary between layer 12 and sleeve 20. Referring again to FIG. 6A, it is noted that the alloyed inner face or bond between layer 12 and pipe 10, formed during the previous galvanizing operation, does not liquefy because the solidification temperature of this alloyed bond is not reached during the heating step. If there is a tendency for the bond between layer 12 and pipe 10 to liquefy, this only increases the alloying of the zinc with the iron to further increase the solidification temperature of this particular region in layer 12. Because of the difference in thermal expansion, during the alloying of layer 12 with the copper in sleeve 20, a high pressure is maintained on the layer 12 during the alloying process.

Referring now to FIGS. 5 and 6, the layer 12 is separated into three separate somewhat roughly defined strata 60, 62 and 64. Stratum 60 includes an alloy of iron and the metal forming layer 12. Stratum 62 remains substantially unchanged and unalloyed. Stratum 64 is an alloy of copper and the metal forming layer 12. Assuming that the metal forming the layer is zinc, the composition of the strata 60, 62 and 64 is illustrated, somewhat schematically, in FIG. 6. It is noted that the composition of the layer 12 changes from high iron to low iron in a direction away from sleeve 10 and changes from high copper to low copper in a direction away from sleeve 20. In this manner, the layer 12 forms a metallurgical bond between sleeves 10, 20 so that these sleeves are now an integral unit and subsequent processing of the resulting bimetal tubing cannot separate the inner copper sleeve from the outer ferrous sleeve. The inner copper sleeve provides the necessary corrosion resistance, and the outer ferrous sleeve provides the necessary strength so that this composite or bimetal tubing is relatively inexpensive and still has the attributes of copper tubing.

It has been found that a fine powder of copper formed in a slurry and coated on the outer surface of sleeve 10 substantially enhances the alloying characteristics between the layer 12 and sleeve 10. Various other slight changes may become obvious to skilled in the art after consideration of the invention defined herein.

Referring now to FIGS. 7 and 8, there is illustrated a method and apparatus for forming the composite sleeve structure before the expanding and heating steps illustrated in FIG. 4. A coil or spool 66 of copper tubing 20 is conveyed along a given path $a$, represented by an arrow in FIG. 7. At the same time, a coil 68 is provided with a strip 70 conveyed along a path $b$, represented by an arrow in FIG. 7. The strip 70 is formed from a ferrous material and has an inner galvanized zinc layer 71, shown in FIG. 8, or a layer of another appropriate metal, such as tin, silver, and aluminum. The tubing 20 and strip 70 are conveyed through forming rolls 72, (only one of which is shown) which forming rolls converge the edges 74, 76 of strip 70 into a longitudinally extending seam 80.

In essence, the forming rolls wrap the strip 70 around the tubing 20 to form an outer sleeve. After the converging edges 74, 76 have been joined, an inductor 90, powered by an appropriate supply of high frequency, represented as generator 92, raises the temperature of the converging edges to seam weld the edges together at seam 80. This is shown in FIG. 8. The resulting composite sleeve structure is pulled through the welding apparatus by drive rolls 94, 96. It is appreciated that FIG. 7 is only schematic in nature and that various structural features of the apparatus have been omitted for the purpose of simplicity.

The composite or resulting structure produced by the apparatus illustrated in FIG. 7 is shown in FIG. 8. The inner sleeve or tubing 20 is encircled by the strip 70. Although the sleeve 20 is shown as abutting layer 71, in practice there is a slight spacing between the sleeve and the layer. After the composite sleeve structure is formed in accordance with the method shown in FIG. 7, the composite structure is then further processed in accordance with the method illustrated in FIG. 4. It is appreciated that the strip 70 could be wrapped around the tubing or sleeve 20 with a lapped joint instead of the welded seam 80. Other similar provisions could be made for making the composite sleeve structure preparatory to practicing the invention as illustrated in FIG. 4.

A modification of the method shown in FIG. 4 is illustrated in FIG. 4A. Ferrous sleeve 100 has an outer surface 102 provided with a hot dipped zinc layer. Concentric with said sleeve 100 is a copper base sleeve 104 having an inner surface 106. By pulling the sleeves 100, 104 through a sinking die 110 and an induction heating inductor 112 by a puller 114, the outer sleeve 104 is contracted around sleeve 100 so that the surface 106 is forced tightly against surface 102. Thereafter, the inductor 112 raises the temperature of the sleeves and the zinc alloys with the copper of sleeve 104 to form the alloyed joint previously discussed.

The present invention has been described in connection with certain physical embodiments; however, various changes may be made in these embodiments without departing from the intended spirit and scope of the present invention as defined in the appended claims.

We claim:

1. In an elongated metal tubing of the type including a first outer shell formed from a first metal and a second inner shell formed from a second metal, the improvement comprising: a bonding layer between said shells, said layer comprising primarily a third metal having a melting point below the melting point of said first and second metals, said layer being metallurgically bonded to said outer shell by an alloy of said first and third metals and said layer being metallurgically bonded to said inner shell by an alloy of said second and third metals such that said layer includes three strata, the first of said three strata comprising said alloy of said first and third metals, the second of said three strata primarily comprising said third metal and the third of said three strata comprising said alloy of said second and third metals.

0. The improvement as defined in claim 1 wherein said first metal is an iron based metal.

3. The improvement as defined in claim 2 wherein said second metal is a copper based metal.

4. The improvement as defined in claim 3 wherein said third metal is a zinc based metal.

5. The improvement as defined in claim 1 wherein said third metal is a zinc based metal.

6. An elongated bimetal tubing comprising: a first outer shell of iron based metal; a second inner shell of copper based metal; and, a bonding layer between said shells, said bonding layer comprising a zinc based metal metallurgically bonded to both of said shells and including three strata, one of said three strata comprising an iron-zinc alloy, another of said three strata comprising primarily said zinc based metal and the other of said strata comprising a copper-zinc alloy, whereby said inner shell is permanently bonded onto said outer shell.

7. An elongated bimetal tubing comprising: a first outer shell of iron based metal; a second inner shell of copper based metal; and, a bonding layer between said shells, said bonding layer comprising a tin based metal metallurgically bonded to both of said shells and including three strata, one of said three strata comprising an iron-tin alloy, another of said three strata comprising primarily said tin based metal and the other of said strata comprising a copper-tin alloy, whereby said inner shell is permanently bonded onto said outer shell.

8. An elongated bimetal tubing comprising: a first outer shell of iron based metal; a second inner shell of copper based metal; and, a bonding layer between said shells, said bonding layer comprising an aluminum based metal metallurgically bonded to both said shells and including three strata, one of said three strata comprising an iron-aluminum alloy, another of said three strata comprising primarily said aluminum based metal and the other of said strata comprising a copper-aluminum alloy, whereby said inner shell is permanently bonded onto said outer shell.